United States Patent
Lamoureux (12)

(10) Patent No.: US 11,475,508 B2
(45) Date of Patent: Oct. 18, 2022

(54) METHODS AND SYSTEMS FOR EVALUATING A SIZE OF A GARMENT

(71) Applicant: VÊTEMENTS FLIP DESIGN INC., Drummondville (CA)

(72) Inventor: Philippe Lamoureux, Montreal (CA)

(73) Assignee: VÊTEMENTS FLIP DESIGN INC., Drummondville (CA)

( * ) Notice: Subject to any disclaimer, the term of this patent is extended or adjusted under 35 U.S.C. 154(b) by 354 days.

(21) Appl. No.: 16/684,697

(22) Filed: Nov. 15, 2019

(65) Prior Publication Data

US 2020/0160430 A1    May 21, 2020

Related U.S. Application Data

(60) Provisional application No. 62/767,583, filed on Nov. 15, 2018.

(51) Int. Cl.
 G06Q 30/06 (2012.01)
 G06T 17/20 (2006.01)
 (Continued)

(52) U.S. Cl.
 CPC ........... *G06Q 30/0643* (2013.01); *A41H 1/02* (2013.01); *G06Q 30/0621* (2013.01);
 (Continued)

(58) Field of Classification Search
 CPC ........... G06Q 30/0643; G06Q 30/0621; G06Q 30/0623; A41H 1/02; G06T 3/40;
 (Continued)

(56) References Cited

U.S. PATENT DOCUMENTS

2014/0240222 A1* 8/2014 Sugita ............... G06Q 30/0621
 345/156
2014/0358737 A1* 12/2014 Burke ............... G06Q 30/0643
 705/27.2

(Continued)

OTHER PUBLICATIONS

Extended European Search Report dated Nov. 12, 2021, in European patent application No. 19885628.8, 8 pages.
(Continued)

*Primary Examiner* — Christopher M Brandt
(74) *Attorney, Agent, or Firm* — Blueshift IP, LLC; Robert Plotkin

(57) ABSTRACT

A method for determining a size of a garment, comprising: receiving an image comprising a representation of the garment and a representation of a reference element, the reference element having a predefined shape and predefined dimensions; identifying the representation of the garment within the received image; identifying the representation of the reference element within the received image; determining first dimensions of the representation of the reference element within the received image and second dimensions of the representation of the garment within the received image; determining real dimensions of the garment using the first dimensions of the representation of the reference element within the received image, the second dimensions of the representation of the garment within the received image and the predefined dimensions of the reference element; and outputting the real dimensions of the garment.

10 Claims, 6 Drawing Sheets

(51) Int. Cl.
    *G06T 7/60*       (2017.01)
    *A41H 1/02*       (2006.01)
    *G06T 3/40*       (2006.01)
(52) U.S. Cl.
    CPC ........... *G06Q 30/0623* (2013.01); *G06T 3/40* (2013.01); *G06T 7/60* (2013.01); *G06T 17/20* (2013.01); *G06T 2215/16* (2013.01)
(58) Field of Classification Search
    CPC ....... G06T 7/60; G06T 17/20; G06T 2215/16; G06T 2207/30124
    See application file for complete search history.

(56) References Cited

U.S. PATENT DOCUMENTS

| | | | | |
|---|---|---|---|---|
| 2016/0104299 | A1* | 4/2016 | George | G06T 7/62 382/199 |
| 2016/0249699 | A1 | 9/2016 | Inghirami | |
| 2016/0358374 | A1* | 12/2016 | Ju | H04N 5/225 |
| 2017/0303616 | A1* | 10/2017 | Koh | G01B 11/022 |
| 2018/0047192 | A1* | 2/2018 | Kristal | G06Q 30/0643 |
| 2019/0130649 | A1* | 5/2019 | O'Brien | G06T 15/005 |
| 2021/0166478 | A1* | 6/2021 | Pai | G06T 19/20 |

OTHER PUBLICATIONS

Zhang, Z., "A Flexible New Technique for Camera Calibration," IEEE Transactions on Pattern Analysis and Machine Intelligence, Technical Report MSR-TR-98-71, vol. 22, No. 11, pp. 1-21 (Dec. 2, 1998).

* cited by examiner

METHODS AND SYSTEMS FOR EVALUATING A SIZE OF A GARMENT

CROSS-REFERENCE TO RELATED APPLICATIONS

This patent application claims the benefit of U.S. Prov. Ser. No. 62/767,583 filed Nov. 15, 2018.

TECHNICAL FIELD

The present invention generally relates to the evaluation of clothes or garments sizes, and more particularly relates to computer-implemented methods and systems to help customers to choose the size of a garment adequately.

BACKGROUND

Online shopping is now widely used in many areas but is not yet extensively developed in the retail sale of clothing.

One reason is the fact that there is no size standardization in the apparel industry. For example, a size "M" from one clothing manufacturer is not necessarily the same as a size "M" from another manufacturer, making it difficult for a customer to know whether a garment purchased online will fit adequately.

Because of that, at least some customers still prefer to go in a store to try on clothes to see which proposed size is the best fit for them.

It would therefore be desirable to provide a computer-implemented method and system for evaluating the size of a garment that would help customers to choose adequately the size of a garment remotely or without having to try on the garment in a physical store.

SUMMARY

According to a first aspect, there is provided a computer-implemented method for determining a size of a garment, comprising: receiving an image comprising a representation of the garment and a representation of a reference element, the reference element having a predefined shape and predefined dimensions; identifying the representation of the garment within the received image; identifying the representation of the reference element within the received image; determining first dimensions of the representation of the reference element within the received image and second dimensions of the representation of the garment within the received image; determining real dimensions of the garment using the first dimensions of the representation of the reference element within the received image, the second dimensions of the representation of the garment within the received image and the predefined dimensions of the reference element; and outputting the real dimensions of the garment.

In one embodiment, the step of receiving an image comprises receiving a picture of the garment and the reference element.

In one embodiment, the method further comprises displaying the received image on a display unit.

In one embodiment, the method further comprises: receiving a first identification of a first reference point located on the representation of the garment and a second identification of a second reference point on the representation of the garment; determining a real distance on the garment corresponding to a distance between the first and second reference points; and outputting the real distance.

In one embodiment, the method further comprises: comparing a shape of the representation of the reference element to the predefined shape; when said comparing is indicative of a deformation between the shape of the representation of the reference element and the predefined shape, determining a shape correction adequate for conforming the shape of the representation of the reference element to the predefined shape; and applying the shape correction to the representation of the garment.

In one embodiment, the steps of comparing, said determining the shape correction and said applying the shape correction to the representation of the garment are performed prior to said determining the first dimensions and the second dimensions and said determining the real dimensions.

In one embodiment, the method further comprises: receiving an orientation of a surface on which the garment and the reference element are deposited; comparing the received orientation to an orientation of a camera with which the image is taken; if the orientation of the camera does not correspond to the received orientation of the surface, correcting a shape of the garment and the reference element using the orientation of the camera relative to the orientation of the surface.

In one embodiment, the step of receiving the orientation of the surface comprises measuring the orientation of the surface on which the garment and the reference element are deposited.

In one embodiment, the method further comprises: receiving an orientation of a surface on which the garment and the reference element are deposited; comparing the received orientation of the surface to an orientation of a reference frame; and if the received orientation of the surface does not correspond to the orientation of the reference frame, adjusting the orientation of the reference frame.

In one embodiment, the step of receiving the orientation of the surface comprises measuring the orientation of the surface on which the garment and the reference element are deposited.

In one embodiment, the method further comprises: generating a scale-defined representation of the garment using the real dimensions of the garment; and outputting the scale-defined representation of the garment.

According to a second broad aspect, there is provided a system for determining a size of a garment, comprising: an object identifying module for: receiving an image comprising a representation of the garment and a representation of a reference element, the reference element having a predefined shape and predefined dimensions; identifying the representation of the garment within the received image; and identifying the representation of the reference element within the received image; and a dimension determining module for: determining first dimensions of the representation of the reference element within the received image and second dimensions of the representation of the garment within the received image; determining real dimensions of the garment using the first dimensions of the representation of the reference element within the received image, the second dimensions of the representation of the garment within the received image and the predefined dimensions of the reference element; and outputting the real dimensions of the garment.

In one embodiment, the object identifying module is configured for receiving a picture of the garment and the reference element.

In one embodiment, the system further comprises a display unit for displaying the received image.

In one embodiment, the display module is further configured for: receiving a first identification of a first reference point located on the representation of the garment and a second identification of a second reference point on the representation of the garment; determining a real distance on the garment corresponding to a distance between the first and second reference points; and outputting the real distance.

In one embodiment, the system further comprises a correction module configured for: comparing a shape of the representation of the reference element to the predefined shape; when said comparing is indicative of a deformation between the shape of the representation of the reference element and the predefined shape, determining a shape correction adequate for conforming the shape of the representation of the reference element to the predefined shape; and applying the shape correction to the representation of the garment.

In one embodiment, the correction module is configured for performing said comparing, said determining the shape correction and said applying the shape correction to the representation of the garment prior to said determining the first dimensions and the second dimensions and said determining the real dimensions.

In one embodiment, the system further comprises a correction module configured for: receiving an orientation of a surface on which the garment and the reference element are deposited; comparing the received orientation to an orientation of a camera with which the image is taken; if the orientation of the camera does not correspond to the received orientation of the surface, correcting a shape of the garment and the reference element using the orientation of the camera relative to the orientation of the surface.

In one embodiment, the correction module is configured for measuring the orientation of the surface on which the garment and the reference element are deposited.

In one embodiment, the system further comprises a correction module configured for: receiving an orientation of a surface on which the garment and the reference element are deposited; comparing the received orientation of the surface to an orientation of a reference frame; and if the received orientation of the surface does not correspond to the orientation of the reference frame, adjusting the orientation of the reference frame.

In one embodiment, the correction module is configured for measuring the orientation of the surface on which the garment and the reference element are deposited.

In one embodiment, the dimension determining module is further configured for generating a scale-defined representation of the garment using the real dimensions of the garment; and providing said scale-defined representation of the garment on a website or on a label attached to the garment in store.

According to a third broad aspect, there is provided a system for determining a size of a garment, comprising: a processing unit, a communication unit for transmitting and receiving data and a memory having stored therein statements and instructions that, when executed by the processing unit, perform the steps of the above-described computer-implemented method.

According to another broad aspect, there is provided a computer-implemented method for evaluating a size of a first garment, comprising: receiving an image comprising a representation of the first garment and a representation of a reference element, the reference element having a predefined shape and predefined dimensions; identifying the representation of the first garment within the received image; identifying the representation of the reference element within the received image; determining first dimensions of the representation of the reference element within the received image and second dimensions of the representation of the first garment within the received image; generating a scale-defined representation of the first garment using the first dimensions of the representation of the reference element, the second dimensions of the representation of the first garment and the predefined dimensions of the reference element; receiving a scale-defined representation of a second garment; and concurrently displaying the scale-defined representation of the first garment and the scale-defined representation of a second garment, at least one of the scale-defined representation of the first garment and the scale-defined representation of a second garment being see-through.

In one embodiment, the step of receiving an image comprises receiving a picture of the first garment and the reference element.

In one embodiment, the method further comprises displaying the received image on a display unit.

In one embodiment, the method further comprises: comparing a shape of the representation of the reference element to the predefined shape; when said comparing is indicative of a deformation between the shape of the representation of the reference element and the predefined shape, determining a shape correction adequate for conforming the shape of the representation of the reference element to the predefined shape; and applying the shape correction to the representation of the first garment.

In one embodiment, the steps of said comparing, said determining the shape correction and said applying the shape correction to the representation of the first garment are performed prior to said determining the first dimensions and the second dimensions and said generating a scale-defined representation of the first garment.

In one embodiment, the method further comprises: receiving an orientation of a surface on which the garment and the reference element are deposited; comparing the received orientation to an orientation of a camera with which the image is taken; if the orientation of the camera does not correspond to the received orientation of the surface, correcting a shape of the garment and the reference element using the orientation of the camera relative to the orientation of the surface.

In one embodiment, the step of receiving the orientation of the surface comprises measuring the orientation of the surface on which the garment and the reference element are deposited.

In one embodiment, the method further comprises: receiving an orientation of a surface on which the garment and the reference element are deposited; comparing the received orientation of the surface to an orientation of a reference frame; and if the received orientation of the surface does not correspond to the orientation of the reference frame, adjusting the orientation of the reference frame.

In one embodiment, the step of said receiving the orientation of the surface comprises measuring the orientation of the surface on which the garment and the reference element are deposited.

In one embodiment, the step of receiving a scale-defined representation of a second garment comprises receiving a size chart from a server associated to the second garment, and generating said scale-defined representation of a second garment from the size chart.

In one embodiment, the step of receiving a scale-defined representation of a second garment comprises scanning a label.

In one embodiment, the at least one of the scale-defined representation of the first garment and the scale-defined representation of a second garment being see-through is further displaceable over the remaining scale-defined representation.

In one embodiment, the method further comprises receiving a first identification of a first reference point and a second identification of a second reference point located on any one of the representation of the first garment and the representation of the second garment, and determining a real distance corresponding to a distance between the first and second reference points.

According to a further broad aspect, there is provided a system for evaluating a size of a first garment, comprising: an object identifying module for: receiving an image comprising a representation of the first garment and a representation of a reference element, the reference element having a predefined shape and predefined dimensions; identifying the representation of the first garment within the received image; and identifying the representation of the reference element within the received image; and a dimension determining module for: determining first dimensions of the representation of the reference element within the received image and second dimensions of the representation of the first garment within the received image; and a display module for: generating a scale-defined representation of the first garment using the first dimensions of the representation of the reference element, the second dimensions of the representation of the first garment and the predefined dimensions of the reference element; receiving a scale-defined representation of a second garment; and concurrently displaying the scale scale-defined representation of the first garment and the scale-defined representation of a second garment, at least one of the scale-defined representation of the first garment and the scale-defined representation of a second garment being see-through.

In one embodiment, the object identifying module is configured for receiving a picture of the first garment and the reference element.

In one embodiment, the system further comprises a correction module configured for: comparing a shape of the representation of the reference element to the predefined shape; when said comparing is indicative of a deformation between the shape of the representation of the reference element and the predefined shape, determining a shape correction adequate for conforming the shape of the representation of the reference element to the predefined shape; and applying the shape correction to the representation of the first garment.

In one embodiment, the correction module is configured for performing said comparing, said determining the shape correction and said applying the shape correction to the representation of the first garment prior to said determining the first dimensions and the second dimensions and said generating a scale-defined representation of the first garment.

In one embodiment, the system further comprises a correction module configured for: receiving an orientation of a surface on which the garment and the reference element are deposited; comparing the received orientation to an orientation of a camera with which the image is taken; if the orientation of the camera does not correspond to the received orientation of the surface, correcting a shape of the garment and the reference element using the orientation of the camera relative to the orientation of the surface.

In one embodiment, the correction module is configured for measuring the orientation of the surface on which the garment and the reference element are deposited.

In one embodiment, the system further comprises a correction module configured for: receiving an orientation of a surface on which the garment and the reference element are deposited; comparing the received orientation of the surface to an orientation of a reference frame; and if the received orientation of the surface does not correspond to the orientation of the reference frame, adjusting the orientation of the reference frame.

In one embodiment, the correction module is configured for measuring the orientation of the surface on which the garment and the reference element are deposited.

In one embodiment, the display module is further configured to displace the at least one of the scale-defined representation of the first garment and the scale-defined representation of a second garment being see-through over the remaining scale-defined representation.

In one embodiment, the display module is further configured for receiving a first identification of a first reference point and a second identification of a second reference point located on any one of the representation of the first garment and the representation of the second garment, and determining a real distance corresponding to a distance between the first and second reference points.

According to still another broad aspect, there is provided a system for evaluating a size of a first garment, comprising: a processing unit, a communication unit for transmitting and receiving data and a memory having stored therein statements and instructions that, when executed by the processing unit, perform the steps of the above described computer-implemented method.

According to still a further broad aspect, there is provided a computer-implemented method for evaluating a size of a first garment, comprising: receiving a scale-defined representation of a reference garment; receiving a scale-defined representation of a second garment; and concurrently displaying the scale-defined representation of the first garment and the scale-defined representation of a second garment, at least one of the scale-defined representation of the first garment and the scale-defined representation of a second garment being see-through and displaceable over the remaining scale-defined representation.

BRIEF DESCRIPTION OF THE DRAWINGS

In order that the invention may be readily understood, embodiments of the invention are illustrated by way of example in the accompanying drawings.

DETAILED DESCRIPTION

Figure 1:
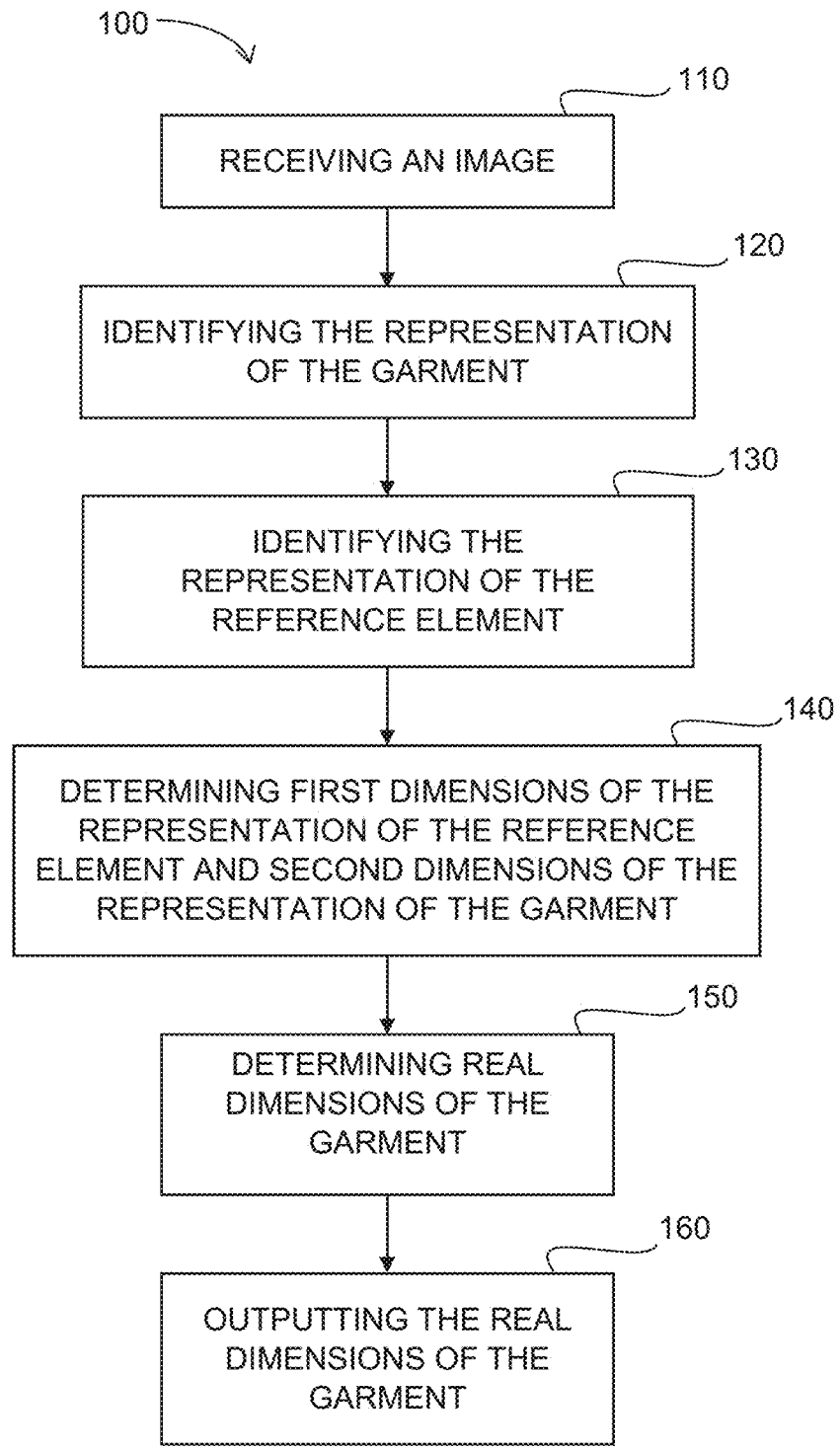
FIG. 1 is a flow chart of a method for determining a size of a garment, according to one embodiment.

In the following description of the embodiments, references to the accompanying drawings are by way of illustration of examples by which the invention may be practiced. It will be understood that other embodiments may be made without departing from the scope of the invention disclosed.

As it would become apparent upon reading of the present description, there are disclosed various computer-implemented methods and systems for determining and/or evaluating the size of items such as a garment. Such methods, typically embedded in a dedicated application, would help customers to choose adequately the size of a garment remotely or without having to try on the garment in a physical store.

More specifically, the proposed methods allow the user to obtain a scale representation of an item, both comparable and measurable. This representation offers the possibility of either easily measuring the dimensions of an item he has in his possession to compare them to a size chart of a shopping website for example or to visually compare, by juxtaposition or overlay, the size of the item with that of a second item that he would not necessarily have at his disposal. Subsequently, the user is then able to judge the level of similarity between the two items by moving the representation of the first item on the second item, or vice versa, as detailed below. It would also be possible to measure any difference in magnitude between the two items, and this at several positions, such as the torso, the sleeves or the waist for example. This allows, among other things, the user to observe differences in size, shape and style between two items. The user would then be in a position to take a better purchasing decision which would have the potential effect of reducing both shopping efforts of the customer and returns for third party partners for example.

As a first exemplary and non-limitative example, when shopping online, the customer could compare a representation of his preferred clothes that he would have previously imported in a dedicated application, with that of a retailer he wants to buy to determine which of the proposed sizes would be the best fit for him. In this example, it would be also possible to measure the difference at different positions between the two compared garments. For example, if the sleeves of the retailer's clothing are longer, the user could know exactly how much longer they are.

As a second exemplary and non-limitative example, the application would also allow the customer to shop for another person such as a friend or a child for example. The customer would only have to import visual representations of a reference clothing in their own application, as better detailed below, to create a virtual wardrobe. Then, the customer could shop online or in store with the virtual wardrobe in hand.

In one embodiment, the customer could go to the store of a partner company to scan the QR code on the label of a desired garment in order to obtain and import the representation of the desired garment in the dedicated application. Then, he could compare it visually with the reference clothing that he would have previously imported in the application and he could observe the resemblance between the reference garment and the desired garment, and quantify the differences.

In a second embodiment, the customer would simply take a picture of the desired garment and import it into the dedicated application and he could compare it with the reference clothing of the virtual wardrobe.

As it will become apparent upon reading of the present description, the methods described herein will enable to establish a means of communication between customers, retailers and manufacturers to express the notion of size in a much more precise and detailed way, even if there is no size standardization in the apparel industry.

Referring to FIG. 1, there is shown a flow chart of a computer-implemented method 100 for determining a size of a garment according to one embodiment of the first aspect of the invention. The method 100 may be particularly useful to determine the real dimensions of a garment such as a reference garment preferred by the user. It may also be used to create a virtual wardrobe of several reference garments of the user.

At step 110, an image comprising a representation of the garment and a representation of a reference element is received. The reference element has a predefined shape and predefined dimensions. For example, a credit card may be used. Alternatively, any known predefined geometric pattern, a A4 sheet provided with a specific pattern such as a checkerboard for example, may be used, as it should be apparent to the skilled addressee and as further detailed thereinafter.

Figure 2:
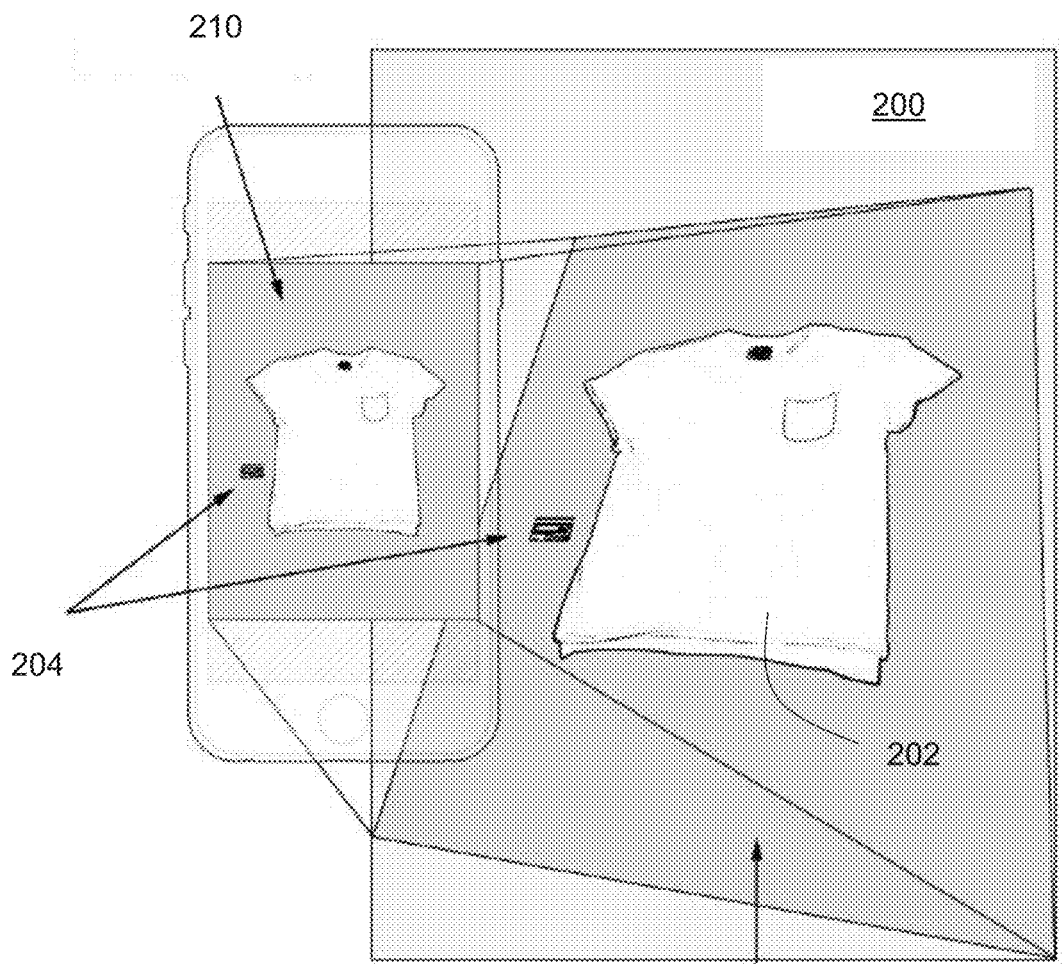
FIG. 2 is a schematic of an original image of a garment and a reference element, and a corrected image of a region of interest of the original image.

In one embodiment, the step 110 of receiving an image comprises receiving a picture or photography of the garment and the reference element. In a further embodiment, the computer-implemented method is embedded in a dedicated application of a personal device provided with a display and a camera and the picture may be directly taken with the camera and automatically imported in the application. FIG. 2 shows an original exemplary picture 200 taken by the user wherein the garment 202 is lay flat on a horizontal surface and is adjacent to the reference element 204, a credit card in the illustrated embodiment. In a further embodiment, the received image is displayed on the user display.

While in FIG. 2, the reference element 204 is positioned next to the garment 202, it should be understood that the reference element could also be positioned over the garment 202 for example. The relative position between the garment 202 and the reference element 204 could vary as long as both the garment 202 and the reference element 204 may be identified within the picture.

Still referring to FIG. 1 and also to FIG. 2, the method 100 comprises the step 120 of identifying the representation of the garment (such as garment 202) within the received image, and the step 130 of identifying the representation of the reference element (such as reference element 204) within the received image. Various methods such as shape recognition methods may be used to perform this identification, as it should be apparent to the skilled addressee and as described in more details below. In one embodiment, the step 120 comprises the identification of the outline of the representation of the garment within the received image and the step 130 comprises the identification of the outline of the representation of the reference element within the received image.

At step 140, the dimensions of the representation of the reference element within the received image (hereinafter referred to as first dimensions) and the dimensions of the representation of the garment within the received image (hereinafter referred to as second dimensions) are determined.

In the picture shown in FIG. 2, one can see that the garment 202 is shown at an angular perspective view. Indeed, it may be more difficult to take a plane view of the garment and the type of picture shown in FIG. 2 should be allowed by the application to ease the use thereof. In such a case and according to one embodiment described below, a shape correction may be implemented.

At step 150, real dimensions of the garment are determined using the first dimensions of the representation of the reference element, the second dimensions of the representation of the garment and the predefined dimensions of the reference element.

At step 160, the real dimensions of the garment are outputted. In one embodiment, the real dimensions are provided to the user on the user display. In a further embodiment, real dimensions may be casted in a predefined computer-implemented model for further use by the application, as detailed below. In a further embodiment, the real dimensions may be stored in memory for further use.

In one embodiment, and as just previously mentioned, a shape correction is implemented to correct inaccuracies coming from the perspective view of the garment in the image. In this case, a step of comparing the shape of the representation of the reference element to the predefined shape is implemented. When the comparison is indicative of a deformation between the shape of the representation of the reference element and the predefined shape (i.e., when the determined shape for the representation of the reference element within the image does not substantially correspond to the predefined shape associated with the reference element), a shape correction adequate for conforming the shape of the representation of the reference element to the predefined shape is determined. Then, the shape correction is applied to the representation of the garment.

In one embodiment, the shape correction is performed prior to the determination of the first dimensions and the second dimensions and the determination of the real dimensions.

As it should be understood, the purpose of the shape correction, also called image correction thereinafter, is to obtain the equivalent of a picture taken parallel to the surface on which the garment is placed, i.e. an image where the parallel lines on the surface are preserved.

Moreover, it is known that lenses used in typical cameras usually induce various forms of distortion, radial and tangential, that could cause a lack of precision on the determined real dimensions of the garment. Various other parameters of the image sensor of a specific camera could also cause various imprecisions. It should be understood that the method 100 may further comprise the correction of the various forms of distortion, if any.

In one embodiment, it may be possible to define a transformation matrix for the image correction only with the outline of the reference element according to the simplified model of a pinhole camera and without knowing physical characteristics of the camera. However, the impacts related to the lack of precision of the contour (quantity of pixels, blur/shading, etc.) may be amplified during the approximation of the transformation, given the relative sizes of the reference element and the garment. In this context, the use of a A4 sheet of paper having known predefined geometric pattern (or any adequate reference element comprising a predefined pattern) instead of a credit card could likely provide better results.

An optional calibration may also be implemented in order to determine more precisely the camera's intrinsic parameters (e.g., focal length and focal point), which are generally estimated from data provided by the camera manufacturer, when available. For example, an iPad Mini 3 has a 3.3 mm focal length and a sensor of 4.54 mm×3.42 mm, the main point being assumed to be perfectly in the center of the sensor. This optional calibration may be used to set and compensate for the various forms of distortion caused by the lens, the post-processing of the camera, etc. Using the optional calibration may also enable to offer a calibrated profile for each phone model and allow the user to calibrate his own device, rather than setting the camera (intrinsic camera matrix) by a simple scaling and translation defined from approximate data on the sensor.

As an example, the user may be invited to perform an initial calibration procedure of his own device according to the method proposed in *A Flexible New Technique for Camera Calibration;* Zhengyou Zhang, 1998. In this method, the user first downloads and prints a predefined geometric pattern, for example a chessboard consisting of 3 cm×3 cm squares on an 8.5"×11" sheet, without magnification, from his mobile device or from any other computer from a website link to an image. Then, he places the sheet on a flat surface and takes several pictures at various angles by moving the camera. The minimum number of pictures required depends on the chosen pattern. For example, only 2 are required for a chessboard. A computer-implemented algorithm identifies the pattern, for example via a corner detection, on each of the pictures and associates each salient point (2D) with a real 3D coordinate based on the dimensions of the pattern. This match of points is then used to estimate the intrinsic (fixed) and extrinsic (variable) parameters of the camera projection matrix for each picture, assuming no distortion. Then, all the parameters, including those of distortion, are adjusted so as to minimize the re-projection error for all the points detected, according to the Levenberg-Marquardt method. A matrix of the basic intrinsic parameters (focal length and main or principal point) as well as the distortion parameters (6 radial and 2 tangential) are then determined. The matrix can be saved as an XML file that can be shared.

Instead of being invited to perform the above described initial calibration, the user may be informed that a calibrated profile adapted to his specific phone model has been previously performed and can be downloaded, without having to update the whole application.

As it should be apparent to the skilled addressee, using such a calibration procedure may enhance accuracy and reliability of determined real dimensions. Indeed, using a simplified model without calibration corrects the perspective effect from four coplanar points. However, if these four points are not defined precisely enough, because of lens distortion of the camera, the results may be less accurate in some cases. However, it should be understood that the calibration procedure may be omitted at least in some cases.

An exemplary embodiment of the shape correction and associated steps is described in details with reference to FIG. 2 in the following. In this embodiment, before the user uses the method for determining a size of the garment previously described for the first time, some physical characteristics of the camera sensor have to be obtained, either from manufacturer specifications, either from a calibration procedure. In addition, when the original picture of the garment and the reference element is taken, the personal device of the user is requested to acquire its positioning relative to the surface, whether using a gyroscope or any another adequate device.

As it will become apparent to the skilled addressee, in this described embodiment, thanks to the physical characteristics of the camera of the portable device, the original picture is first processed to correct for the perspective shooting. Then, the region of interest is located on the corrected image and its contour is cut out automatically and/or assisted by the user. Similarly, the reference object is recognized and located on the corrected image. Since the actual/real dimensions of the latter are known, the apparatus will be able to determine the scale, in terms of pixels per actual measurement unit, centimeter for example, to be associated with the item.

We know that for any pair of images of the same plane surface, there is a homography connecting these 2 images. One of these images is the original picture taken by the user, while the other corresponds to the corrected image.

This homography is expressed as a matrix 3*3 with 8 degrees of freedom, and therefore can be defined from 4 pairs of corresponding points. If the four corners of the corrected image are used, the problem becomes to determine the position of the vertices of the convex quadrilateral (projection of a rectangle) which correspond to the points on the original picture (region of interest). Once the correspondence is established, it is only a question of interpolating the color of each pixel of the corrected image from those covering the region of interest in the original picture.

To define the region of interest, a simplified model of a pinhole camera may be used. In this model, the correspondence between the real points (3D, $\vec{w}$) and those on the original picture (2D, $\vec{p}$) can be expressed, in homogeneous coordinates, as $\vec{p} \sim C \vec{w}$ where C is the camera matrix of dimensions 3*4.

This matrix C represents a series of transformations in 2D and 3D that can be grouped together to obtain: $C = C_{Int} \times C_{Ext}$ where $C_{Ext}$ expresses the position and orientation of the camera (i.e. R is the 3D rotational matrix and $\vec{t}$ is a translation vector expressing the camera position relative to an origin), while $C_{Int}$ describes the intrinsic characteristics of the camera.

$$C_{Int} = \begin{bmatrix} f_x & s & c_x \\ 0 & f_y & c_y \\ 0 & 0 & 1 \end{bmatrix} = \begin{bmatrix} 1 & 0 & c_x \\ 0 & 1 & c_y \\ 0 & 0 & 1 \end{bmatrix} \begin{bmatrix} f_x & 0 & 0 \\ 0 & f_y & 0 \\ 0 & 0 & 1 \end{bmatrix} \begin{bmatrix} 1 & s/f_x & 0 \\ 0 & 1 & 0 \\ 0 & 0 & 1 \end{bmatrix}$$

$$C_{Ext} = \begin{bmatrix} R & \vec{t} \\ 0 & 1 \end{bmatrix} = \begin{bmatrix} 1 & 0 & 0 & t_x \\ 0 & 1 & 0 & t_y \\ 0 & 0 & 1 & t_z \end{bmatrix} \begin{bmatrix} r_{11} & r_{12} & r_{13} & 0 \\ r_{21} & r_{22} & r_{23} & 0 \\ r_{31} & r_{32} & r_{33} & 0 \\ 0 & 0 & 0 & 1 \end{bmatrix}$$

Because only the orientation of the camera in relation to the plane XY on which the item is placed is considered, it may be decided to fix the camera at the origin and to orient the X axis so that $C_{Ext}$ is only a combination of rotations around the X axis (pitch) and the Y axis (roll).

In one embodiment, data from a gyroscope, an accelerometer and optionally a magnetometer may be combined to define the relative position of the mobile device relative to a given reference frame such as the surface on which a garment is positioned (by default, the Z axis is vertical and the X axis points in an arbitrary direction on the horizontal plane). The position may be available directly in the form of angles (Euler) that can be used to calculate $C_{Ext}$, and/or in terms of quaternions. This form allows to easily change the frame of reference (e.g., vertical surface rather than the ground) by simple multiplication.

In one embodiment, $C_{Int}$ may be calculated via a calibration procedure combining several pictures of a given known geometric pattern such as the chessboard described above. It may also be derived approximately, for a size image w×h pixels, from characteristics listed by the manufacturer, including the focal length F and the dimensions of the sensor W×H ($f_x$=F w/W; $f_y$=F h/H), as well as some simplifications such as the straightness of the image axis (shear s=0) and the central position of the origin ($c_x$=w/2, $c_y$=h/2).

Once the matrix C has been determined for a given image size and a given relative position (which may be defined by a given α pitch and a given β roll), a function (and its inverse) can be defined which establishes a correspondence between the position of a pixel (u, v) on the image and a real coordinate (x, y, z) on the horizontal plane (at a value z≠0 arbitrary fixed).

For example, for a value of z=1;

$$x(u, v) = \frac{((u - c_x)\cos\beta - f_x \sin\beta)f_y}{((u - c_x)\sin\beta + f_x \cos\beta)f_y \cos\alpha - f_x(v - c_y)\sin\alpha}$$

$$y(u, v) = \frac{f_x(v - c_y)\cos\alpha + ((u - c_x)\sin\beta + f_x \cos\beta)f_y \sin\alpha}{((u - c_x)\sin\beta + f_x \cos\beta)f_y \cos\alpha - f_x(v - c_y)\sin\alpha}$$

By transforming the 4 corners of the picture taken by the user, a convex quadrilateral on the horizontal plane at the value z fixed previously (the visible part of the plane on the picture) is obtained. There is then a rectangle with the same ratio of the original picture, which is entirely within this quadrilateral. Such a rectangle, without necessarily being maximal, can be obtained using the minimum/maximum values for each of the axes, as illustrated in FIG. 2.

The coordinates of the corners of this rectangle on the plane X Y are then transformed to the space of the image with the inverse function to define the region of interest. This region of interest is then be used for the generation of the corrected image 210 via interpolation.

In the above description, it is assumed that the frame of reference of the camera has the same orientation as that of the surface on which the garment is deposited when the picture is taken using the camera, i.e. the frame of reference is parallel to the surface on which the garment is positioned. For example, the frame of reference may be horizontal and the user may be asked to deposit the garment onto a horizontal surface. In this case, it is assumed that the frame of reference of the camera has the same orientation as that of the surface on which the garment is deposited.

However, if the orientation of the frame of reference of the camera is different from that of the surface on which the garment is positioned, a correction of the orientation of the frame of reference of the camera may be performed to correspond to the orientation of the surface.

In one embodiment, the user is requested to measure the orientation of the surface on which the garment (hereinafter referred to as the working frame) is positioned. This can be performed by positioning the mobile device on the working frame and measuring the orientation of the working frame using the mobile device in which the camera is embedded. For example, the gyroscopes of the mobile device may be used for measuring the orientation of the working frame. Then the orientation of the reference frame is compared to the orientation of the working frame. It should be understood that any adequate devices for measuring the orientation of a frame may be used. For example, gyroscopes, accelerometers, etc. may be used.

If the orientation of the working frame substantially corresponds to that of the reference frame of the camera, then no correction is required. For example, if the reference frame of the camera is orthogonal to the gravity force and the working frame is horizontal, then no correction of the reference frame is required.

If the orientation of the working frame does not correspond to that of the reference frame of the camera, then a correction of the reference frame is performed before the picture of the garment be taken for example. The method for correcting the reference frame of the reference frame is described below.

In one embodiment, it is possible to determine a sequence of rotations allowing to pass from the reference frame to the working frame, p, and from the working frame to the actual frame, q. The actual frame represents the frame of the mobile device when the picture is taken. The orientation provided by the mobile device corresponds to the transformation from the reference frame to the actual frame, r.

In one embodiment, quaternions are used to express the rotations in three dimensions. The use of quaternions allows avoiding some problems related to the numerical stability and the Gimbal lock while rendering easy the composition.

A rotation r of angle $\theta$ about an axis represented by the vector $\vec{u}=(u_x, u_y, u_z)$, $\|\vec{u}\|=1$ can be expressed as:

$$r = e^{\frac{\theta}{2}(u_x i + u_y j + u_z k)} = \cos\frac{\theta}{2} + (u_x i + u_y j + u_z k)\sin\frac{\theta}{2}, \|r\|=1$$

Where i, j and k are three unitary vectors representing the Cartesian axes.

For the unitary quaternion r, there exists a reciprocal r−1 so that $rr^{-1}=r^{-1}r=1$:

$$r^{-1} = \frac{r^*}{\|r\|^2} = r^* = -\frac{1}{2}(r + iri + jrj + krk)$$

A rotation r equivalent to the sequence of rotations p and q (about a same rotation point) can be expressed as:

r=qp $rp^{-1}=(qp)p^{-1}=q(pp^{-1})=q$

Therefore, the orientation q relative to the working frame can be determined by multiplying the orientation r provided by the mobile device by the reciprocal $p^{-1}$ of the orientation of the working frame measured by the mobile device once positioned on the working frame.

While it should be understood that any adequate method for identifying the reference element and the garment within the received image may be used, in one embodiment, the identification may be performed by a method for selecting and cutting the contour of elements contained in an image. For example, the selection and cutting of the contour may be done using the following methods: Active Contour Models and GrabCut™.

The Active Contour Models method, also known as Snakes™, is used to delimit the outline of objects in an image. A series of dots form an initial outline that is progressively revised to minimize an energy function. The total energy of the contour is calculated from internal forces (e.g., rigidity) and external forces generated from the image (e.g., contour detection). The process stops when the function reaches a local minimum.

In one embodiment, this technique requires a prior knowledge of the position of the object. Thus, in this case the user is asked to draw roughly the outlines of the garment and the reference element with his finger or a pointing device on the display displaying the image. This tracing is then simplified by removing the crossings, resampling it to a regular internal, and smoothing it with a Gaussian filter. The skilled addressee will appreciate that this last step is mainly used for aesthetic purposes and may be optional. The skilled addressee will also appreciate that an automatic detection of the position of the object without the user's help may also be considered.

In order to make this method less sensitive to the quality of the initial approximation, to better adapt it to non-convex forms and/or to improve its speed of convergence, this method may be augmented by a few extensions. The first extension replaces the calculation of external forces with a vector field that extends the range of forces generated by the contours of the image and better adapts it to non-convex shapes (Gradient Vector Flow, GFV). A second extension is the addition of a weak external force whose purpose is to help the outline to expand when the influence of others is minimal (Balloon Force).

The vector field used by the GVF is built, just as the external forces of the original version are generated from the contours detected in the image. However, given the variability of the quality of the image and the subject itself, the result of several techniques, executed at different scales (multi-scale), is combined to extract the most significant contours.

First, a contour detection is performed directly on the color image rather than on the black and white version or on each of the components (Red, Blue, Green for example) separately as typical with traditional algorithms. To do this, each pixel is considered as a 3D vector, and the absolute value of the maximum rate of variation is used to represent the strength of the contour at this point (Gradient of Multi-Image).

Next, a Watershed image segmentation technique is used several times with regions markers randomly placed, following a Poisson distribution, and with noise added. The number of "contours" detected is, in a way, limited by the number of markers, and only the strongest borders are drawn multiple times.

Once the dynamic contour is stabilized on this vector field, the region it delimits is slightly inflated before being used to initialize the separation method of the foreground and the background of the image, according to the GrabCut™ method. While the contour selection can be done roughly on images of reduced size, the cutting may directly affect the determination of measures and therefore may require more precision. In one embodiment and in order to reduce the computing power required on the portable device, the method may be executed in several stages on images more and more large, extrapolating the intermediate results up to the original size.

The detection of the reference element, a credit card for example, uses the same algorithm as for the cutting of the garment, the GrabCut method, but on a smaller scale, although an automated detection could also be alternatively considered.

In one embodiment, the user is first asked to indicate where the reference element is, approximately, on the image. The segmentation algorithm is then executed inside a window defined around this point in order to isolate the foreground elements.

Subsequently, the contour of each important region in the foreground may be approximated using a quadrilateral, and the quality of the representation may be evaluated in terms of area, perimeter, ratio of aspect, angle, etc. If the shape of the region is similar to that of the searched object, the segmentation method is applied again on the image, but this time using the region previously detected as the initial value. The result is then revalidated using more stringent criteria.

If no contour passes the test, the same procedure is run again by sliding and/or altering the window size randomly until a satisfactory result is obtained, or until a maximum number of attempts is reached.

Referring back to the method for determining a size of a garment previously described with reference to FIG. 1, in one embodiment, as it will be more detailed thereinafter, the user may request specific real dimensions of the garment between two points on the garment chosen by the user. For that purpose, the user may use a pointing device such as a touch screen, a mouse, an electronic pen for non-limitative examples to provide a first and a second reference point located on the representation of the garment. Selection of the two reference points may be assisted, but is not constrained only by contour points to enhance experience of the user and let him measure any distance that may be of interest for him. In this method, first and second identification of the first and second reference points respectively are received and a real distance on the garment corresponding to a distance between the first and second reference points is determined and then provided to the user. The real distance measured may be given to the user in the measurement unit of his choice.

In one embodiment, the method may also be used by a garment manufacturer or retailer to provide the proposed garments with a scale-defined or scaled representation thereof. In this case, a scale-defined representation of the garment is generated using the real dimensions of the garment and a target scale and then provided on a website or on a label attached to the garment in store for use by the user, as it should become apparent to the skilled addressee.

Figure 3:
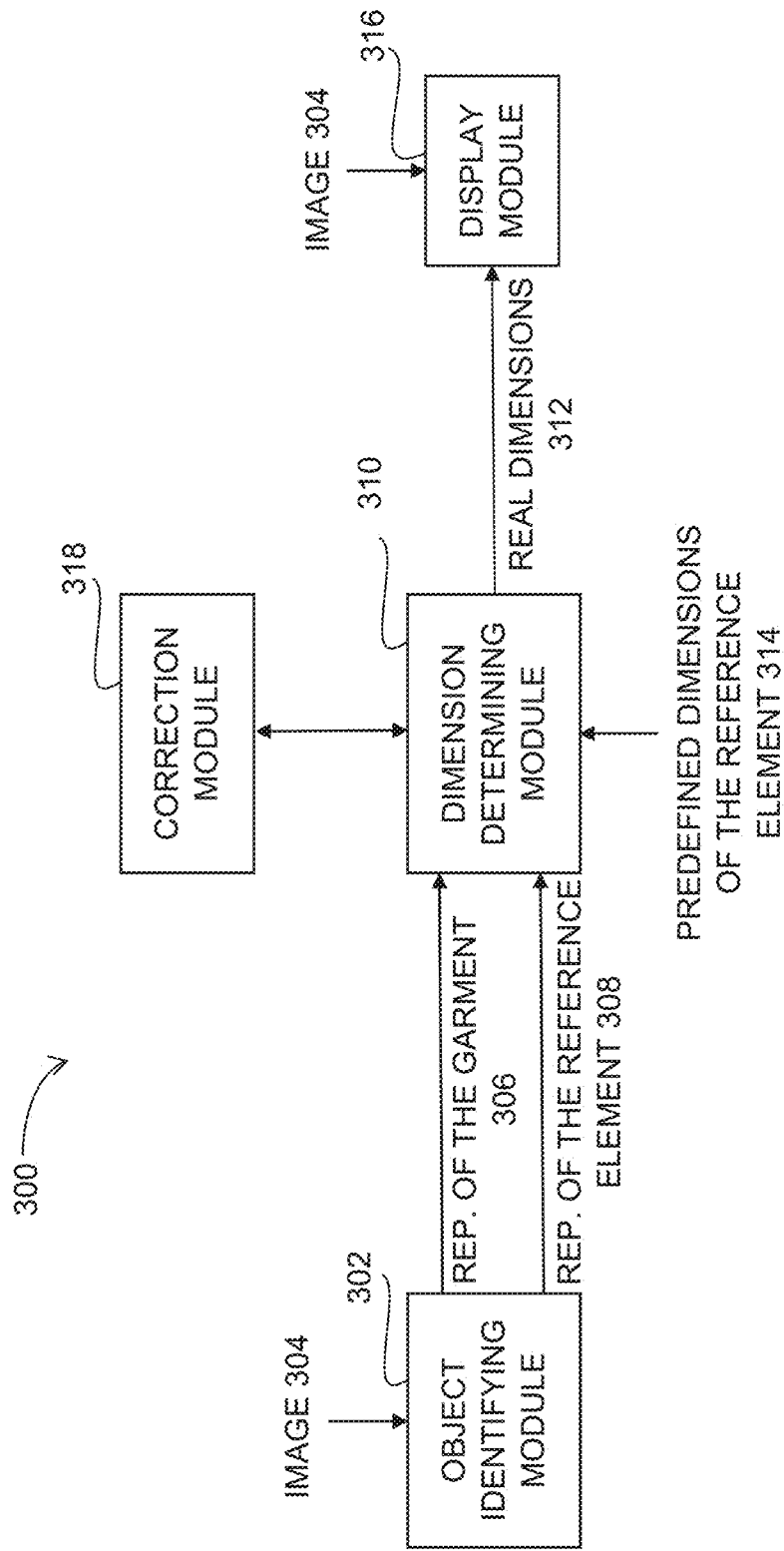
FIG. 3 is a diagram of a system for determining a size of a garment, according to one embodiment.

FIG. 3 illustrates one embodiment of a system 300 for determining a size of a garment. The system 300 comprises an object identifying module 302 for receiving an image 304 containing a representation of the garment and a representation of a reference element. The reference element has a predefined shape and predefined dimensions, as described above. The object identifying module 302 is also configured for identifying the representation of the garment 306 within the received image 304 and identifying the representation of the reference element 308 within the received image 304. The system 300 also comprises a dimension determining module 310 for determining the dimensions of the representation of the reference element 308 within the received image 304 (i.e. the first dimensions) and the dimensions of the representation of the garment 306 within the received image 304 (i.e. the second dimensions). The dimension determining module 310 is also adapted for determining real dimensions 312 of the garment using the first dimensions of the representation of the reference element 308, the second dimensions of the representation of the garment 306 and the predefined dimensions of the reference element 314. The dimension determining module 310 is further configured for outputting the real dimensions 312 of the garment.

In one embodiment, the object identifying module 302 is configured for receiving a picture of the garment and the reference element, i.e. a picture containing a representation of the garment and a representation of the reference element. In another embodiment, the system 300 is further provided with a display module 316 for displaying on a user display the received image 304 as well as the real dimensions 312 of the garment.

In a further embodiment, the system 300 shown in FIG. 3 is embedded in an electronic device provided with a processing unit, a display and a camera and the picture may be directly taken with the camera and automatically imported in a dedicated application.

In one embodiment, the system 300 further has a correction module 318 configured for comparing a shape of the representation of the reference element 308 to the predefined shape and dimensions of the reference element 314. As described above, when the comparison is indicative of a deformation between the shape of the representation of the reference element 308 and the predefined shape, the correction module 318 determines a shape correction adequate for correcting the shape of the representation of the reference element 308 to the predefined shape, and applies the shape correction to the representation of the garment 306.

In one embodiment, the correction module 318 is configured for performing the comparison, the determination of the shape correction and the application of the shape correction to the representation of the garment 306 prior to the determination of the first dimensions and the second dimensions and the determination the real dimensions 312, as detailed above.

In the same or another embodiment, the correction module 318 may be configured for correcting the shape of the garment using the orientation of the surface on which it is deposited. In this case, the correction module 318 is configured for receiving the orientation of the surface on which the garment and the reference element are deposited and comparing the received orientation to the orientation of the camera with which the image/picture is taken. If the orientation of the camera does not correspond to the received orientation of the surface, the correction module 318 corrects the shape of the garment and the reference element using the orientation of the camera relative to the orientation of the surface, as described above.

In one embodiment, the corrections module 318 is further configured to correct the orientation of the reference frame, as described above.

In a further embodiment, the display module 316 is further configured for receiving a first identification of a first reference point located on the representation of the garment and a second identification of a second reference point on the representation of the garment, and determining a real distance on the garment corresponding to a distance between the first and second reference points, as described above.

As previously mentioned, in one embodiment, the system 300 may also be used by a garment manufacturer or retailer to provide the proposed garments with a scale-defined or scaled representation thereof. In this case, the dimension determining module is further configured for generating a scale-defined or scaled representation of the garment using the real dimensions of the garment. Then, the scale-defined representation of the garment is provided on a website or on a label attached to the garment in store, for use by the user.

The above-described method may also be implemented as a system for determining a size of a garment is provided, the system comprising at least a processing unit, a communication unit for transmitting and receiving data and a memory having stored therein statements and instructions that, when executed by the processing unit, perform the steps of the computer-implemented method described previously with reference to FIG. 1, as it should become apparent to the skilled addressee.

Figure 5:
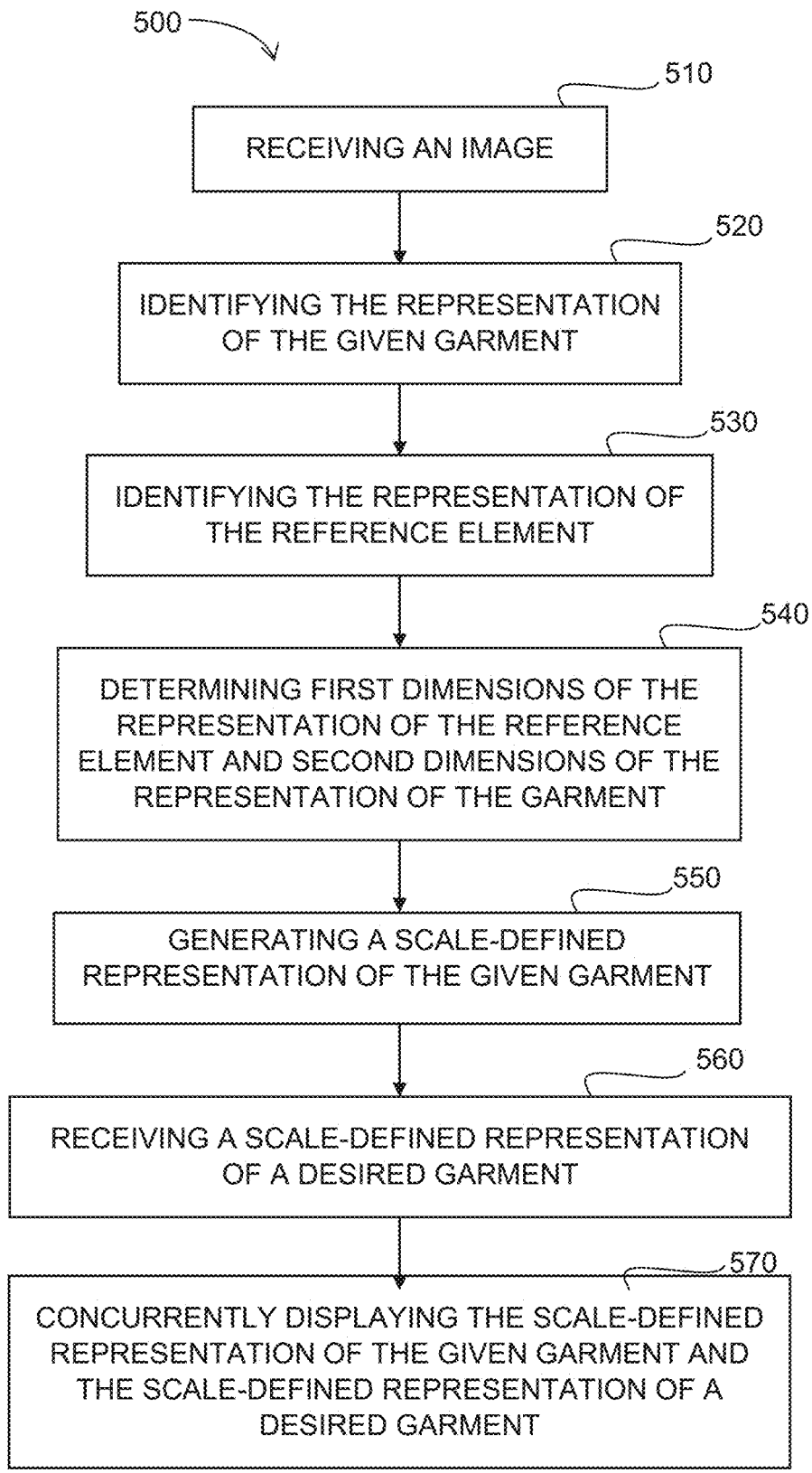
FIG. 5 is a flow chart of a method for evaluating a size of a given garment, according to one embodiment.

FIG. 5 illustrates one embodiment of a computer-implemented method 500 for evaluating a size of a given garment. While the method 100 illustrated in FIG. 1 may be used for determining the real dimensions of a garment such as a reference garment preferred by the user, the method 500 may be used for comparing a given garment to a desired or reference garment to better evaluate the size of this latter.

At step 510, an image comprising a representation of the given garment and a representation of a reference element. The reference element has a predefined shape and predefined dimensions, as described with reference to FIGS. 1 and 2.

In one embodiment, the step 510 of receiving the image comprises receiving a picture of the given garment and the reference element. In one embodiment, the computer-implemented method 500 is embedded in a dedicated application of an electronic device provided with a display and a camera and the picture may be directly taken with the camera and automatically imported in the application. FIG. 2 shows an original exemplary picture 200 taken by the user wherein the garment 202 is lay flat on a horizontal surface and is adjacent to the reference element 204 which is a credit card in the illustrated embodiment. The received image may be displayed on the user display.

Still referring to FIG. 5 and also to FIG. 2, the method 500 comprises the step 520 of identifying the representation of the given garment within the received image, and the step 530 of identifying the representation of the reference element within the received image. As described above, any adequate method for identifying an object within an image may be used for identifying the garment and the reference element within the received image.

At step 540, the dimensions of the representation of the reference element within the received image (hereinafter referred to as the first dimensions) and the dimensions of the representation of the given garment within the received image (hereinafter referred to as the first dimensions) are determined.

As described above with reference to the method 100, the method 500 may comprises correction steps such as a shape correction step, a calibration step, and/or the like.

At step 550, a scale-defined or scaled representation of the given garment is generated using the first dimensions of the representation of the reference element, the second dimensions of the representation of the given garment and the predefined dimensions of the reference element, i.e., scaling the received representation of the given garment at a desired or target scale. In one embodiment, the scale-defined or scaled representation of the given garment corresponds to the received representation of the given garment so that no scaling occurs at step 550.

At step 560, a scale-defined or scaled representation of the reference garment is received. In one embodiment and as described below, the step 560 comprises receiving a representation of the reference garment and modifying the dimensions of the received representation of the reference garment to obtain the scaled or scale-defined representation of the reference garment having the same scale as that of the scaled representation of the given garment.

In one embodiment, the dimensions of the representation of the given garment are modified so that the scaled representation of the given garment be at the same scale as that of the received scaled representation of the reference garment.

In another embodiment, the dimensions of the representation of the given garment are not modified and the scaled representation of the given garment corresponds to the received representation of the given garment. In this case, the step 560 of receiving the scaled representation of the reference garment comprises receiving a representation of the reference garment and modifying the dimensions of the representation of the reference garment to obtain the scaled or scale-defined representation of the reference garment so that the scaled representation of the given garment and the scaled representation of the representation be at the same scale.

In a further embodiment, the step 550 comprises scaling the received representation of the given garment to a target scale to obtain the scaled representation of the given garment and the step 560 comprises receiving a representation of the reference garment and scaling the received representation of the reference garment to the target scale to obtain the scaled representation of the reference garment so that the two scaled representations may be compared together.

It should be understood that any adequate method for generating the representation of a garment at a given scale may be used for obtaining a scaled or scale-defined representation of a garment such as the scale-defined representation of the given garment and the scale-defined representation of the reference garment.

Figure 4:
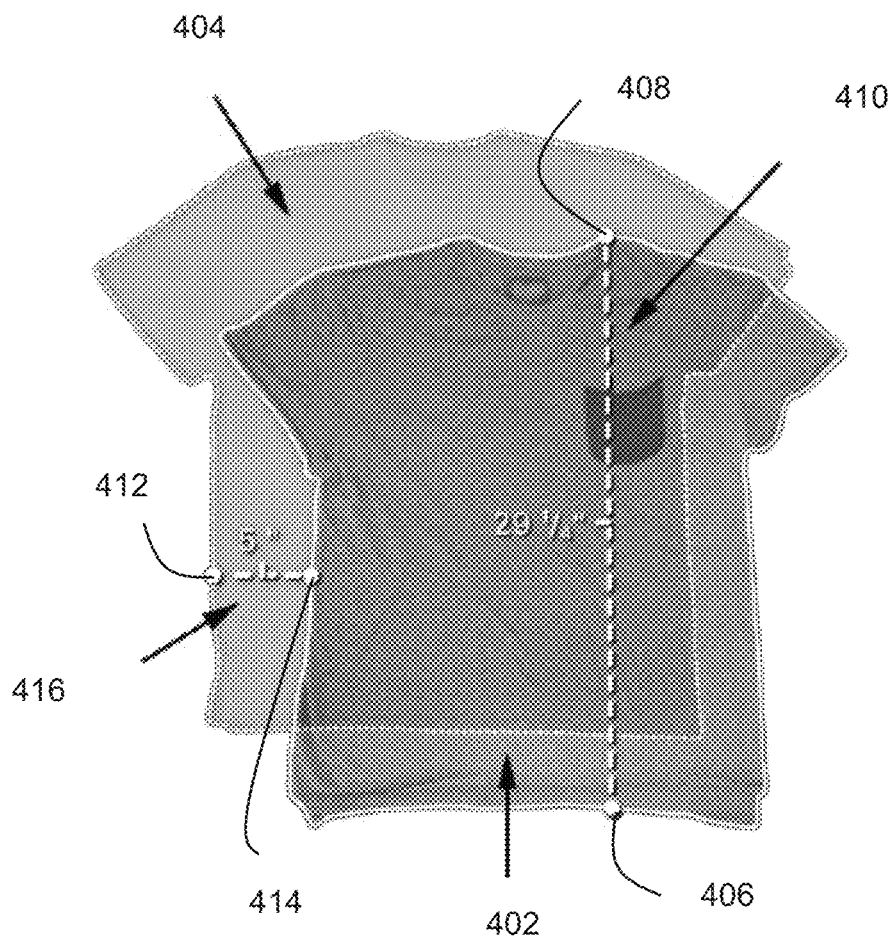
FIG. 4 is a schematic of a scale-defined representation of a given garment and a scale-defined representation of a desired garment, one of them being see-through, according to one embodiment.

At step 570, the scaled representation of the given garment and the scaled representation of the desired garment are concurrently displayed, as shown in FIG. 4. At least one of the scale-defined representation of the given garment 402 and the scale-defined representation of a desired garment 404 is see-through, as illustrated in FIG. 4. Depending on the context, real pictures of the garments or simplified representations thereof may be displayed.

In one embodiment, a first one of the two displayed scaled representations has a fixed position on the display unit while the second one of the two displayed scaled representations has a movable position so that the user may move the second to superimpose the two displayed scaled representations in order to compare the size of the two garments. It should be understood that the display unit may comprise a touch screen and the position of the second displayed representation may be changed by touching the screen and moving the second displayed representation. However, it should be understood that any adequate method or system, such as any adequate input device, for moving a displayed image within the screen on which it is displayed may be used.

In another embodiment, the two displayed scaled representations are movable.

In one embodiment, the user may choose which one of the given garment and the desired garment is placed on the foreground and is see-through illustrated. In a further embodiment, the garment being see-through illustrated is further displaceable over the remaining illustrated garment to enhance experience of the user. With such an embodiment, the user may easily visually compare various specific dimensions.

In one embodiment, the scaled representation of the reference garment is stored in memory on the user electronic device and the reference garment may be a garment of which the dimensions corresponds to ideal or desired dimensions. For example, the user may want to buy a garment for another person such as a partner. In this case, the reference garment may be a garment of the partner. While being physically in a store without his partner, the user may take a picture of a garment he would like to buy for his partner and compare the dimensions of the photographed garment to the reference garment having ideal dimensions for his partner to determine if the dimensions of the photographed garment would fit his partner.

In another embodiment, the reference garment corresponds to a garment offered for sale by a retailer or a manufacturer. In this case, the scaled representation of the reference garment may be stored in memory on a server. In order to choose an adequate size, the user take a picture of one of his garments having ideal dimensions, i.e., the given garment, and download the scaled representation of the reference garment having a given size or given dimensions. The user may then compare reference garments having different sizes to his photographed garment in order to select the ideal size for the reference garment.

In one embodiment, upon request of the user, a size chart from a manufacturer/retailer website associated to the reference garment is first received, and the scaled representation of the reference garment is generated from the size chart.

In one embodiment, the user downloads the scaled representation of the reference garment by scanning the label secured to the reference garment. The label may have a barcode or QR code associated with the garment and optionally a size for the garment for example.

In one embodiment, as illustrated in FIG. 4, the user may be allowed to perform measurements. In one embodiment, the user can manually select a first and a second reference points 406 and 408 on the representation of one of the given and reference garments to manually compare each of the dimensions of interest. The method may further determine and display a real distance 410 corresponding to a distance between the first and second reference points 406 and 408.

In the same or another embodiment, the user may provide a first reference point 412 located on a first one of the representations and a second reference point 414 located on a second one of the representations. The real distance 416 between the first point 412 and second point 414 is then determined and displayed to the user.

As previously mentioned, the selection of the two reference points may be assisted, but is not constrained only by contour points to enhance experience of the user and let him measure any distance that may be of interest for him.

In one embodiment, a shape correction is implemented to correct inaccuracies coming from the perspective view of the given garment in the image. In this case, a step of comparing a shape of the representation of the reference element to the predefined shape is implemented. When the comparing is indicative of a deformation between the shape of the representation of the reference element and the predefined shape, a shape correction adequate for correcting the shape of the representation of the reference element to the predefined shape is determined. Then, the shape correction is applied to the representation of the given garment. The exemplary shape correction detailed above may be used.

In a further embodiment, the shape correction and associated steps is performed prior to the determination of the first dimensions and the second dimensions and the generation of a scale-defined representation of the given garment.

In one embodiment, the correction of the shape is performed using the orientation of the camera as described above.

In one embodiment, the method further comprises a step of correcting the orientation of a frame of reference before taking a picture of the garment.

Figure 6:
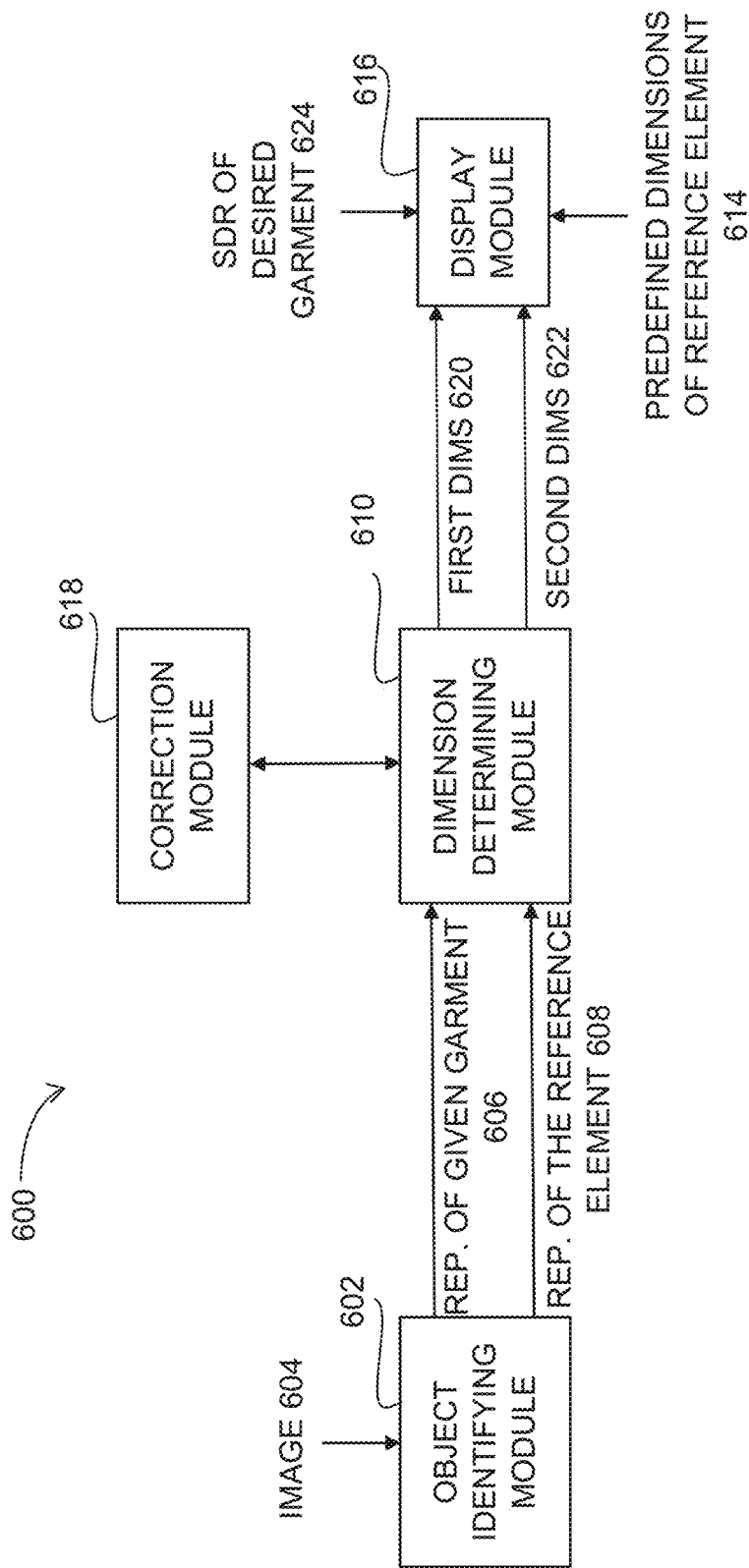
FIG. 6 is a diagram of a system for evaluating a size of a given garment, according to one embodiment; and Further details of the invention and its advantages will be apparent from the detailed description included below.

Referring now to FIG. 6 and according to the fifth aspect, a system 600 for evaluating a size of a given garment will now be described according to one embodiment. The system 600 is provided with an object identifying module 602 for receiving an image 604 comprising a representation of the given garment and a representation of a reference element. The reference element has a predefined shape and predefined dimensions, as previously described. The object identifying module 602 is further adapted for identifying the representation of the given garment 606 within the received image 604 and identifying the representation of the reference element 608 within the received image 604. The system 600 also has a dimension determining module 610 for determining first dimensions 620 of the representation of the reference element 608 within the received image 604 and second dimensions 622 of the representation of the given garment 606 within the received image 604. The system 600 is also provided with a display module 616 for generating a scale-defined representation of the given garment using the first dimensions 620 of the representation of the reference element 608, the second dimensions 622 of the representation of the given garment 606 and the predefined dimensions of the reference element 614. The display module 616 is also configured for receiving a scale-defined representation of a desired or reference garment 624, and concurrently displaying the scale scale-defined representation of the given garment and the scale-defined representation of a reference garment 624. At least one of the scale-defined representation of the given garment and the scale-defined representation of a reference garment 624 is see-through.

In one embodiment, the object identifying module 602 is configured for receiving a picture of the given garment and the reference element, as previously described.

In a further embodiment, the system 600 shown in FIG. 6 is embedded in a personal device provided with a display and a camera and the picture may be directly taken with the camera and automatically imported in a dedicated application running the system.

In one embodiment, the system 600 further has a correction module 618 configured for comparing a shape of the representation of the reference element to the predefined shape. When the comparing is indicative of a deformation between the shape of the representation of the reference element and the predefined shape, the correction module determines a shape correction adequate for correcting the shape of the representation of the reference element to the predefined shape; and applies the shape correction to the representation of the given garment, as it should be apparent from the detailed description above.

In a further embodiment, the correction module 618 is configured for performing the comparing, the determining the shape correction and the applying the shape correction to the representation of the given garment prior to the determination of the first dimensions 620 and the second dimensions 622 and the generation of a scale-defined representation of the given garment.

In another embodiment, the correction module 618 may be configured for correcting the shape of the garment using the orientation of the surface on which it is deposited. In this case, the correction module 618 is configured for receiving the orientation of the surface on which the garment and the reference element are deposited and comparing the received orientation to the orientation of a camera with which the image/picture is taken. If the orientation of the camera does not correspond to the received orientation of the surface, the correction module 618 corrects the shape of the garment and the reference element using the orientation of the camera relative to the orientation of the surface, as described above.

In one embodiment, the corrections module 618 is further configured to correct the orientation of the reference frame, as described above.

In one embodiment, the display module 616 is further configured to displace the at least one of the scale-defined representation of the given garment and the scale-defined representation of a reference garment 624 being see-through over the remaining scale-defined representation, as described above.

In another embodiment, the display module 616 is further configured for receiving a first identification of a first reference point and a second identification of a second reference point located on any one of the representation of the given garment and the representation of the reference garment, and determining a real distance corresponding to a distance between the first and second reference points, as previously mentioned with reference to FIG. 4.

In a further embodiment, the system 600 may also be used to generate the scale-defined representation of a reference garment 624, as it should become apparent to the skilled addressee. In this embodiment, the user takes a picture in a retail store of the reference garment and a reference element and the picture is provided to the object identifying module 602. The object identifying module 602 and the dimension determining module 610 determines third dimensions of a representation of the reference garment according to the taken picture. The display module 616 is further configured for generating the scale-defined representation of a reference garment 624.

In one embodiment, the method 500 may be implemented as a system for evaluating a size of a given garment. The system has a processing unit, a communication unit for transmitting and receiving data and a memory having stored therein statements and instructions that, when executed by the processing unit, perform the steps of the computer-implemented method of the fourth aspect.

According to a further aspect, there is provided a computer-implemented method for evaluating a size of a given garment. In a first step, a scale-defined representation of a reference garment is received while a scale-defined representation of a reference garment is received in a second step. Any of the above described methods could be used for obtaining the two scale-defined representations, as it should be apparent to the skilled addressee. For example, both of them could be obtained through an associated adequate picture. The two scale-defined representations are then concurrently displayed. At least one of the scale-defined representation of the given garment and the scale-defined representation of a reference garment is see-through and displaceable over the remaining scale-defined representation as detailed above.

In one embodiment, the method 100 may be implemented as a system comprising a processing module which typically includes one or more Computer Processing Units (CPUs) and/or Graphic Processing Units (GPUs) for executing modules or programs and/or instructions stored in memory and thereby performing processing operations, a memory, and one or more communication buses for interconnecting these components. The communication buses optionally include circuitry (sometimes called a chipset) that interconnects and controls communications between system components. The memory includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory optionally includes one or more storage devices remotely located from the CPU(s). The memory, or alternately the non-volatile memory device(s) within the memory, comprises a non-transitory computer readable storage medium. In some embodiments, the memory, or the computer readable storage medium of the memory stores the following programs, modules, and data structures, or a subset thereof:

an object identifying module for identifying the garment and the reference element within an image;

a dimension determining module for determining real dimensions of the garment; and an image correction module.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory may store a subset of the modules and data structures identified above. Furthermore, the memory may store additional modules and data structures not described above.

The above description is intended more as functional description of the various features which may be present in a management module than as a structural schematic of the embodiments described herein. In practice, and as recognized by those of ordinary skill in the art, items shown separately could be combined and some items could be separated.

In one embodiment, the method 500 may be implemented as a system comprising a processing module which typically includes one or more Computer Processing Units (CPUs) and/or Graphic Processing Units (GPUs) for executing modules or programs and/or instructions stored in memory and thereby performing processing operations, a memory, and one or more communication buses for interconnecting these components. The communication buses optionally include circuitry (sometimes called a chipset) that interconnects and controls communications between system components. The memory includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory optionally includes one or more storage devices remotely located from the CPU(s). The memory, or alternately the non-volatile memory device(s) within the memory, comprises a non-transitory computer readable storage medium. In some embodiments, the memory, or the computer readable storage medium of the memory stores the following programs, modules, and data structures, or a subset thereof:

an object identifying module for identifying the garment and the reference element within an image;

a dimension determining module for determining dimensions;

an image generator module for generating scaled representations; and an image correction module.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory may store a subset of the modules and data structures identified above. Furthermore, the memory may store additional modules and data structures not described above.

The above description is intended more as functional description of the various features which may be present in a management module than as a structural schematic of the embodiments described herein. In practice, and as recognized by those of ordinary skill in the art, items shown separately could be combined and some items could be separated.

Although the above description relates to specific preferred embodiments as presently contemplated by the inventors, it will be understood that the invention in its broad aspect includes mechanical and functional equivalents of the elements described herein.

What is claimed is:

1. A computer-implemented method for evaluating a size of a first garment, comprising:
   receiving an image comprising a representation of the first garment and a representation of a reference element, the reference element having a predefined shape and predefined dimensions;
   identifying the representation of the first garment within the received image;
   identifying the representation of the reference element within the received image;
   comparing a shape of the representation of the reference element to the predefined shape;
   when said comparing is indicative of a deformation between the shape of the representation of the reference element and the predefined shape, determining a shape correction adequate for conforming the shape of the representation of the reference element to the predefined shape;
   applying the shape correction to the representation of the garment, thereby obtaining a corrected representation of the garment;
   determining first dimensions of the representation of the reference element within the received image and second dimensions of the corrected representation of the first garment within the received image;
   generating a scale-defined representation of the first garment using the first dimensions of the representation of the reference element, the second dimensions of the corrected representation of the first garment and the predefined dimensions of the reference element;
   receiving a scale-defined representation of a second garment; and
   concurrently displaying the scale-defined representation of the first garment and the scale-defined representation of the second garment, at least one of the scale-defined representation of the first garment and the scale-defined representation of the second garment being see-through.

2. The computer-implemented method of claim 1, wherein said comparing, said determining the shape correction and said applying the shape correction to the representation of the first garment are performed prior to said determining the first dimensions and the second dimensions and said generating a scale-defined representation of the first garment.

3. The computer-implemented method of claim 1, further comprising: receiving an orientation of a surface on which the garment and the reference element are deposited; comparing the received orientation to an orientation of a camera with which the image is taken; if the orientation of the camera does not correspond to the received orientation of the surface, correcting a shape of the garment and the reference element using the orientation of the camera relative to the orientation of the surface.

4. The computer-implemented method of claim 1, further comprising: receiving an orientation of a surface on which the garment and the reference element are deposited; comparing the received orientation of the surface to an orientation of a reference frame; and if the received orientation of the surface does not correspond to the orientation of the reference frame, adjusting the orientation of the reference frame.

5. The computer-implemented method of claim 1, wherein the at least one of the scale-defined representation of the first garment and the scale-defined representation of the second garment being see-through is further displaceable over a remaining scale-defined representation.

6. A system for evaluating a size of a first garment, comprising:
   an object identifying module for:
   receiving an image comprising a representation of the first garment and a representation of a reference element, the reference element having a predefined shape and predefined dimensions;
   identifying the representation of the first garment within the received image; and
   identifying the representation of the reference element within the received image;
   a correction module configured for:
   comparing a shape of the representation of the reference element to the predefined shape;
   when said comparing is indicative of a deformation between the shape of the representation of the reference element and the predefined shape, determining a shape correction adequate for conforming the shape of the representation of the reference element to the predefined shape; and
   applying the shape correction to the representation of the garment to obtain a corrected representation of the garment; and
   a dimension determining module for:
   determining first dimensions of the representation of the reference element within the received image and second dimensions of the corrected representation of the first garment within the received image; and
   a display module for:
   generating a scale-defined representation of the first garment using the first dimensions of the representation of the reference element, the second dimensions of the corrected representation of the first garment and the predefined dimensions of the reference element;
   receiving a scale-defined representation of a second garment; and
   concurrently displaying the scale scale-defined representation of the first garment and the scale-defined representation of the second garment, at least one of the scale-defined representation of the first garment and the scale-defined representation of the second garment being see-through.

7. The system of claim 6, wherein the correction module is configured for performing said comparing, said determining the shape correction and said applying the shape correction to the representation of the first garment prior to said determining the first dimensions and the second dimensions and said generating a scale-defined representation of the first garment.

8. The system of claim 6, further comprising a correction module configured for:

receiving an orientation of a surface on which the garment and the reference element are deposited;

comparing the received orientation to an orientation of a camera with which the image is taken;

if the orientation of the camera does not correspond to the received orientation of the surface, correcting a shape of the garment and the reference element using the orientation of the camera relative to the orientation of the surface.

9. The system of claim 6, further comprising a correction module configured for:

receiving an orientation of a surface on which the garment and the reference element are deposited;

comparing the received orientation of the surface to an orientation of a reference frame; and if the received orientation of the surface does not correspond to the orientation of the reference frame, adjusting the orientation of the reference frame.

10. The system of claim 6, wherein the display module is further configured to displace the at least one of the scale-defined representation of the first garment and the scale-defined representation of a second garment being see-through over a remaining scale-defined representation.

\* \* \* \* \*